United States Patent [19]

Bierman

[11] Patent Number: 4,709,502

[45] Date of Patent: Dec. 1, 1987

[54] ELECTRIC ROACH TRAP

[76] Inventor: Albert Bierman, 2380 Windward Cir., West Lake Village, Calif. 91361

[21] Appl. No.: 775,776

[22] Filed: Sep. 13, 1985

[51] Int. Cl.4 ............................................. A01M 1/22
[52] U.S. Cl. ..................................................... 43/112
[58] Field of Search ................................. 43/112, 98

[56] References Cited

U.S. PATENT DOCUMENTS

| | | | |
|---|---|---|---|
| 1,073,029 | 9/1913 | Doney | 43/112 |
| 1,899,199 | 2/1933 | Kaiser | 43/112 |
| 2,012,384 | 8/1935 | Gatti | 43/112 |
| 2,038,719 | 4/1936 | Davidson | 43/112 |
| 2,177,846 | 10/1939 | Swangren | 43/112 |
| 2,219,743 | 10/1940 | Karr | 43/112 |
| 2,465,574 | 3/1949 | Brown | 43/112 |
| 4,074,456 | 2/1978 | Tidwell | 43/112 |
| 4,349,982 | 9/1982 | Sherman | 43/131 |

Primary Examiner—Gene P. Crosby

[57] ABSTRACT

An electric roach trap comprising a housing with three spaced apart conductors composed of a water pan conductor, a floor and wall conductor and a bait holder conductor. These conductors are connected to an outside power source so that when a roach enters the trap and contacts simultaneously two of these spaced apart conductors, the roach will be electrocuted. The electric roach trap of this invention is safe to handle, easy to clean, has shock proof protection for humans and pets, and has special features such as a window to see into the trap to see if it contains dead roaches and should be cleaned and an indicator light to tell when the trap has power and is operational when it is located in a dark area. An additional feature is that the trap is shock proof in that electrical current to the trap is terminated when the trap is opened by removing the top housing from the bottom housing.

5 Claims, 9 Drawing Figures

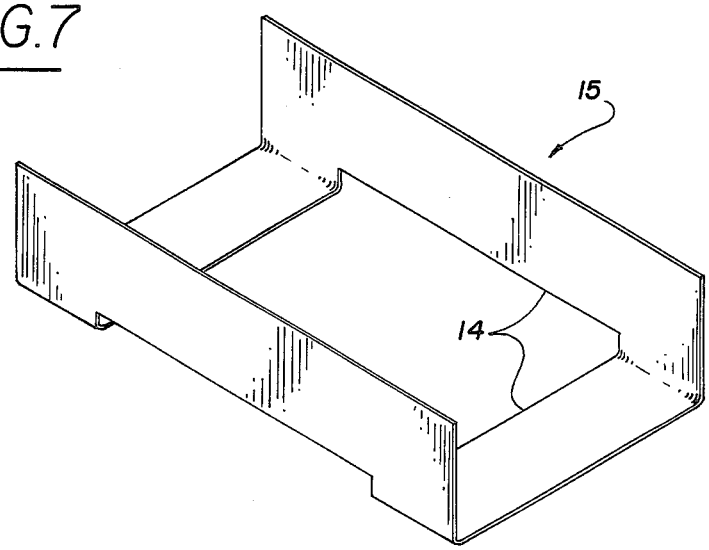
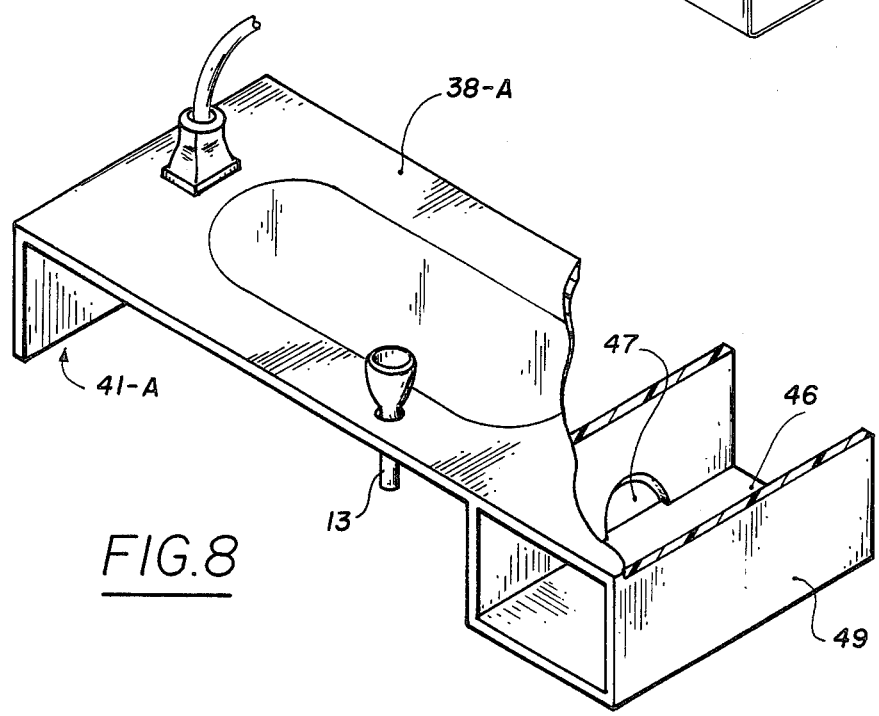
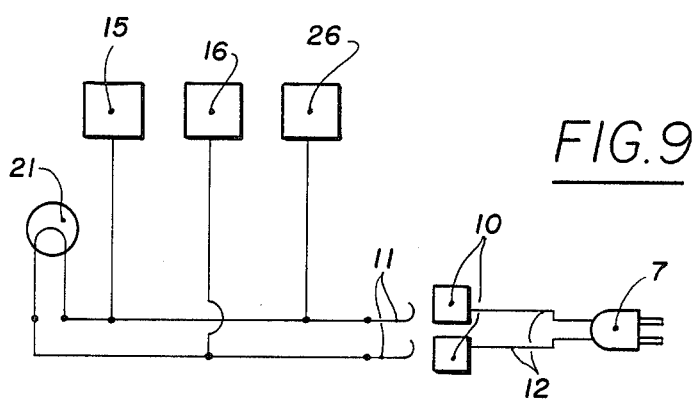

ELECTRIC ROACH TRAP

BACKGROUND OF THE INVENTION

This invention is directed to a new and novel insect trap to help rid a household of crawling insects and mice, being more efficient and safer to use, and one that can be made and sold for less than previously prior art traps of this type. In particular this invention is directed to an improved electric roach trap to kill roaches or mice by electrocution. Transformers to boost voltage, fluorescent light to attract insects or grids or guards to prevent electrical shock to humans are not used in this invention as is used in prior art inventions of this type, thus reducing the cost to manufacturers in producing this invention. This invention uses ordinary house current of 110 volts in conjunction with a water pan conductor. Grids or guards are not needed since all the conductors are enclosed within the housing of the trap and the only way to physically contact the conductors is to remove the top of the housing from the bottom of the housing and in so doing would disconnect all current to the conductors.

SUMMARY OF THE INVENTION

The field of this invention is directed to an electric roach trap so that when an insect such as a roach enters the trap and contacts simultaneously two spaced apart conductors, the roach will be killed by electrocution.

It is an object of this invention to help eliminate roaches, mice other pests electrically without the use of poison sprays or poison baits. It is another object of this invention to provide a small protable electric roach trap that is safe to handle, easy to clean and economical to use. It is another object of this invention to provide an electric roach trap that does not use a light to attract insects into the trap like prior art traps since roaches do not like light but prefer dark damp areas such as this invention provides. A special feature of this invention consists of a window in the top of the housing for observing when the electric roach trap contains dead roaches and should be cleaned. Another feature of this invention is to provide a way for putting water into the water pan conductor of the electric roach trap without having to handle or open the trap. It is still another object of this invention to provide an electric roach trap with an indicator light so one can tell when the trap is operating and also to facilitate observation of the trap if it is located in a dark area. Another object of this invention is to provide an electric roach trap with shock proof protection features for humans and pets. Still another object of this invention is to provide an alternative embodiment whereby it can be used as a trap to catch mice.

BRIEF DESCRIPTION OF THE DRAWINGS

FIG. 7 is an enlarged isometric view of the floor and wall conductor utilized within the roach trap of this invention;

FIG. 8 is an isometric view of an alternative embodiment of this invention with the top of the housing partly removed to show structure and an opening whereby mice can enter the trap when it is used as a mouse trap; and FIG. 9 is a schematic of the electric circuitry of the electric roach trap of this invention.

DESCRIPTION OF THE PREFERRED EMBODIMENT

Figure 1:
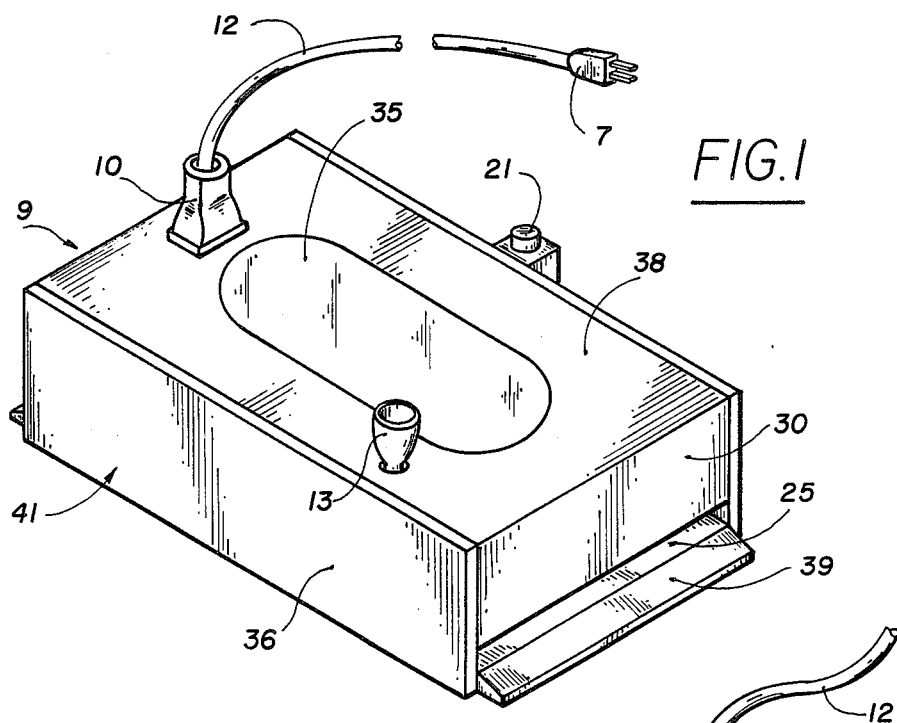
FIG. 1 is an isometric view of the electric roach trap of this invention.
Figure 2:
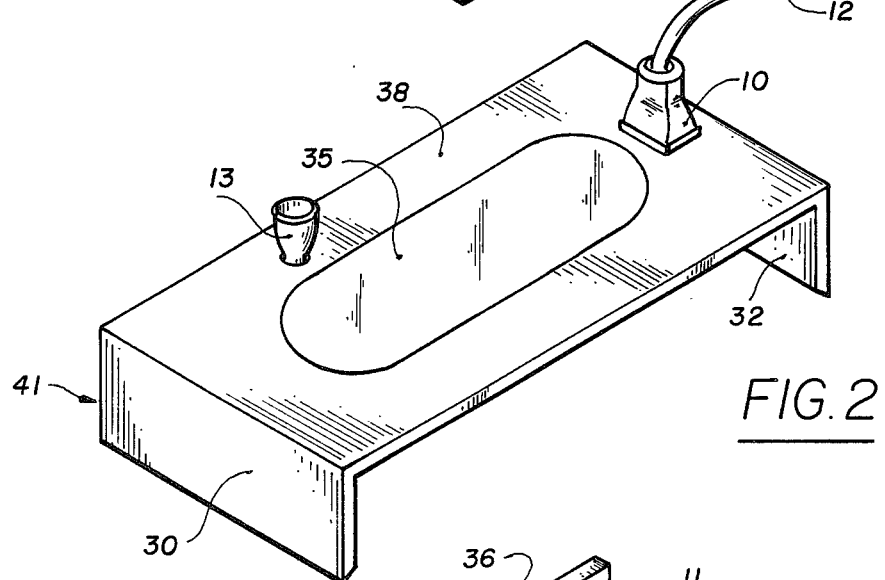
FIG. 2 is an isometric view of the top of the housing of this invention.

The electric roach trap of this invention is generally indicated at 9 in FIGS. 1, 4, 5, and 6, and is made of a non-conductive plastic or wood material consisting of a top housing 41 and a bottom housing 42. The top housing 41 has a top surface 38 to which is permanently attached a female electrical connector plug 10 from which extends a power line 12 that is to be connected to an outside power source as shown in FIGS. 1, 2, 5 and 6. Window 35 in top housing 41 allows observation into the electric roach trap 9 as shown in FIGS. 1 and 2.

Figure 3:
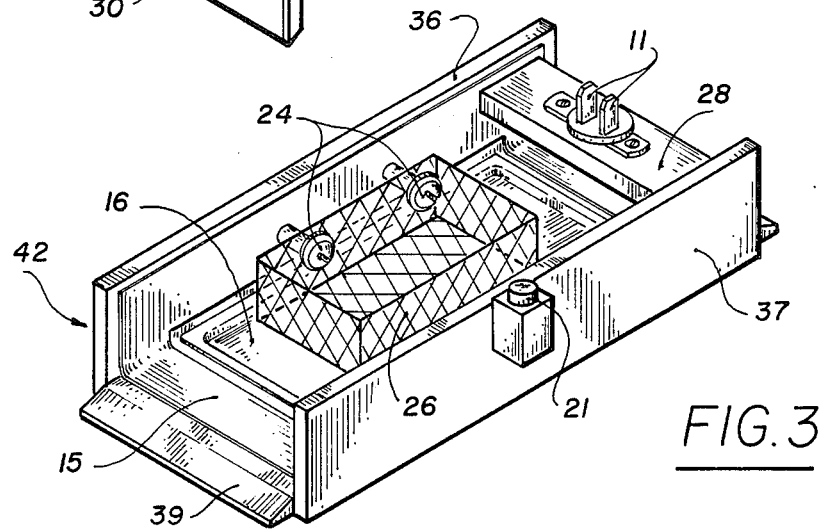
FIG. 3 is an isometric view of the bottom of the housing of this invention.
Figure 4:
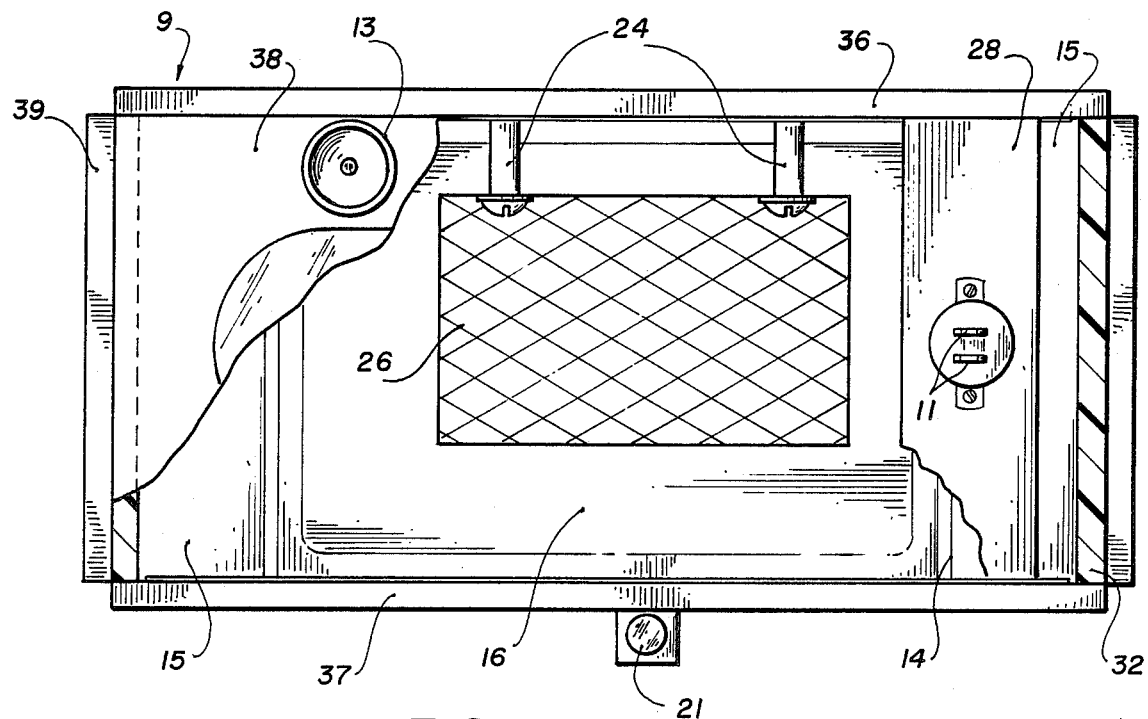
FIG. 4 is a plan view of the electric roach trap with the top of the housing removed in part and also a support beam partly removed for showing of the contents and structure.
Figure 5:
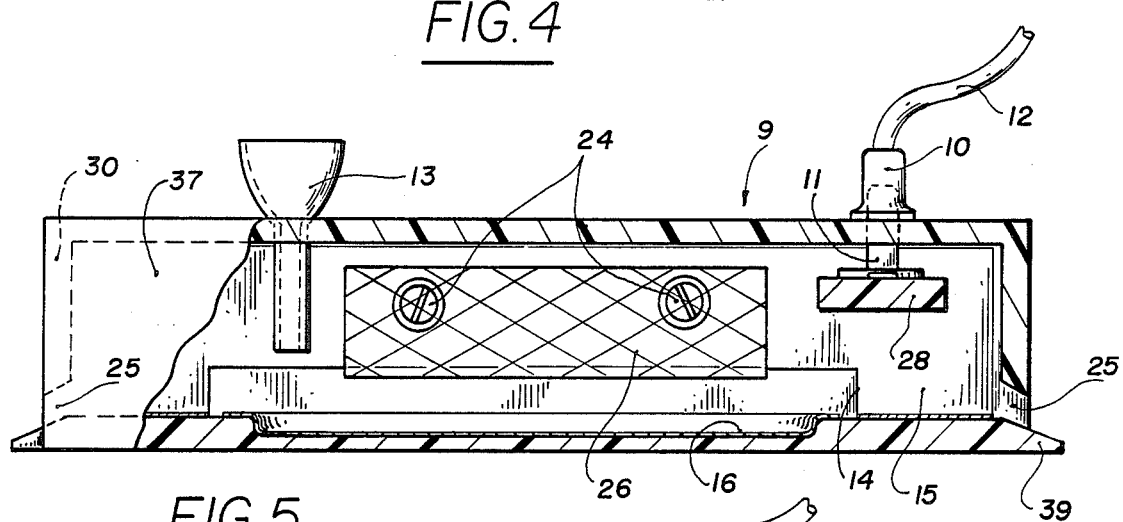
FIG. 5 is a right side view of the electric roach trap of this invention with part of the side wall removed to show contents and structure in elevation.
Figure 6:
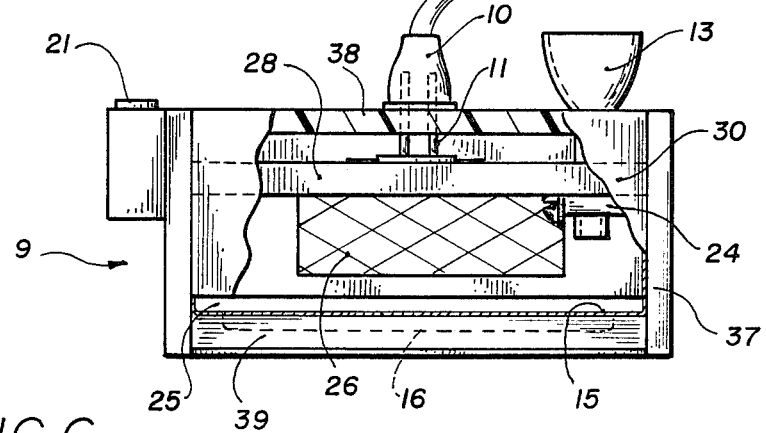
FIG. 6 is a front end view of the electric roach trap of this invention with part of the front wall removed to show contents and structure in elevation.

The top housing 41 also has a front wall 30 and a rear wall 32 as shown in FIG. 2. FIG. 3 shows the bottom housing 42 consisting of the bottom floor 39, left side wall 36 and right side wall 37. Male electrical connector plug 11 is attached to a beam support 28. When top housing 41 is properly placed on the bottom housing 42, the male electrical connector plug 11 will electrically connect with the female electrical plug 10 allowing current into the electric roach trap 9 and to conductors 15, 16, 26 and to indicator light 21 which is a miniature ¼ watt 110 D.C. neon electric light on outside wall 37. Reference number 26 in general will be referred to as the bait holder conductor which is attached to the side wall 36 by two spacers 24.

With reference to the drawings, reference number 15 will be referred to as the floor and wall conductor. This conductor 15 is channel shaped and is placed against walls 36 and 37 and floor 39 of the bottom housing. Floor and wall conductor 15 includes enlarged opening 14. Water pan conductor 16 is located in the area defined by opening 14. The water pan conductor 16 is formed from a thin gage rectangular conductive sheet metal, preferably copper or brass, with approximately 3/16 inch turned up edges on all four sides so as to form a shallow pan whereby water can be put into the water pan conductor 16 through funnel 13. The water pan conductor 16 will operate when dry but will be more effective when a small quantity of water covers its surface and will impart a more severe shock to any roach that contacts the water pan conductor 16 and the floor and wall conductor 15 or the bait holder conductor 26.

The bait holder conductor 26 is mounted approximately 3/16 of an inch above the water pan conductor 16 and is electrically connected in series with the floor and wall conductor 15 and water pan conductor 16 which in turn are in parallel with the indicator light 21. The floor and wall conductor 15 is spaced from the water pan conductor 16 by approximately ⅛ of an inch. If too much water is put into the water pan conductor 16 causing overflow thus wetting the floor and wall conductor 15, this overflow will evaporate instantly creating a damp moist condition within the trap 9 that is attractive to roaches.

The roach entrances 25 are at both ends of the electric roach trap 9 and each consist of a crack-like opening 25 across the width of the bottom housing floor 39. This opening 25 is approximately ⅛ inch high making it impossible for children or pets to contact any of the conductors 15, 16 or 26 within the trap 9. If top housing 41 is properly placed on bottom housing 42, front wall 30 and back wall 31 are spaced approximately ⅛ of an inch from floor 39 of bottom housing 42 thus making the crack-like openings 25 whereby roaches can enter the trap 9. Floor 39 is beveled at both ends of the trap 9 to form a ramp whereby roaches can enter the electric roach trap 9 more readily. The bait holder conductor 26 is formed of an electrically conductive metallic woven grid or screen formed in the shape of a rectangular, open top, basket.

Non-poisonous bait to attract roaches into the electric roach trap 9 can be made from a piece of bread covered with cola syrup or cocoa paste made from powdered cocoa mixed with water, both of which are very attractive to roaches. Other non-poisonous baits and odors that attract roaches are well-known by people in the trade, one such chemical odor being 2 dimethyl 3 isoprodylide necyclopropy and another synthetic substance called pekiplanond which is an aphrodisiac for periplaneta amerkana, the American cockroach.

FIG. 8 illustrates a modification of the top housing 38-A used in place of top housing 38 when the electric roach trap is used to catch mice. Outer wall 49 and floor 46 form a passageway whereby mice can enter the trap 9 through hole entrance 47.

FIG. 9 is a schematic of the electric circuitry of the electric roach trap 9. Connector plug 7 attached to line 12, connects to a power source (not shown). Male connector plug 11 connects to female plug 10 causing indicator light 21 to be activated indicating conductors 15, 16 and 26 have current and the circuit between the conductors is open. When a roach enters the trap 9 and contacts simultaneously either conductors 15 and 16 or conductors 26 and 16, the circuit will be completed and the roach electrocuted.

What is claimed is:

1. An electric roach trap comprising:
    a housing comprising a top housing and a bottom housing, said housing substantially enclosing at least three spaced apart conductors, each conductor representing a different type having a structurally different shape, said conductors being spaced from each other, each said conductor having a separate electrical conducting path which is normally open, upon a roach contacting simultaneously any two of said conductors the roach will be electrocuted with the conductors being located at locations to insure that each roach entering said trap will be electrocuted.
2. The electric roach trap as defined within claim 1 wherein:
    one of said conductors comprising a pan within which is to be located a quantity of water.
3. The electric roach trap as defined within claim 2 wherein:
    another of said conductors being characterized as a floor and wall conductor substantially covering said interior wall surface of said bottom housing.
4. The electric roach trap as defined within claim 3 wherein:
    the remaining said conductor being characterized as a bait holder conductor having a bait holding chamber adjusted to contain bait.
5. The electric roach trap as defined in claim 4 including:
    an indicator light mounted within said housing, said indicator light being operated when electrical energy is being supplied to said light.

* * * * *